(12) United States Patent
Nagano

(10) Patent No.: US 6,222,815 B1
(45) Date of Patent: Apr. 24, 2001

(54) OPTICAL DISK RECORDING METHOD AND DEVICE

(75) Inventor: Takashi Nagano, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/260,164

(22) Filed: Mar. 1, 1999

(30) Foreign Application Priority Data

Mar. 5, 1998 (JP) .................................................. 10-053748

(51) Int. Cl.[7] ...................................................... G11B 7/00
(52) U.S. Cl. ............................................. 369/116; 369/54
(58) Field of Search ................................. 369/47, 48, 49, 369/50, 54, 58, 59, 116, 112

(56) References Cited

U.S. PATENT DOCUMENTS 4,727,531 * 2/1988 Ito et al. ............................ 369/54 X
5,490,133 * 2/1996 Nakamura et al. .............. 369/112 X

* cited by examiner

Primary Examiner—Muhammad Edun
(74) Attorney, Agent, or Firm—Pillsbury Winthrop LLP

(57) ABSTRACT

In an optical disk recording device for irradiating a recording light beam onto an optical disk to form pits having lengths ranging from 3Ts to 11Ts (where T represents a length of a unit time period in a longitudinal direction of a pit track), a sample and hold circuit samples and holds levels of a reflection signal, representative of a reflection of the recording light beam from the optical disk, for a predetermined time period between points of 1T and 3Ts after the start of a rising edge of the reflection signal. Comparator circuit makes a comparison between the sampled and held levels of the reflection signal and a predetermined reference level. Automatic laser power control circuit controls the power of the recording light beam on the basis of a result of the comparison by the comparator circuit. With such an arrangement, the recording power of the light beam can be controlled promptly with increased accuracy.

6 Claims, 3 Drawing Sheets

OPTICAL DISK RECORDING METHOD AND DEVICE

BACKGROUND OF THE INVENTION

The present invention relates to methods and devices for recording on an optical disk, such as a CD-R, CD-RW, CD-WO, MD or DVD, by use of light power, and more particularly to a technique for controlling the light power promptly with increased accuracy.

Among various types of known write-once and rewritable optical disks is one having a recording layer of dye or coloring material. Specifically, such dye-layer-type optical disks include a substrate that is coated with a film of dye-based recording material by use of the "spin coat" method. Thus, each of these dye-layer-type optical disks tends to have a nonuniform coating thickness across its radius, due to which its recording sensitivity would substantially differ between the inner and outer circumferential portions. Further, a fingerprint, dust or other foreign matter, adhering to the surface of the optical disk, would sometimes cause undue absorption or scattering of the recording laser light beam, thereby preventing satisfactory recording.

In Japanese Patent Laid-open Publication No. HEI-5-282672, there is proposed an improved optical disk recording method designed to avoid the above-mentioned inconvenience. Specifically, in the proposed optical disk recording method, a reflection of the recording laser light beam from the optical disk is constantly monitored, and the irradiation power of the light beam is controlled in accordance with the monitored reflection levels so that desired pits are formed in the optical disk in a constantly appropriate manner.

However, the proposed optical disk recording method is disadvantageous in that it can not promptly control the power of the laser light beam in an accurate manner, because sampling points of the reflection levels are not specifically set in the proposed method.

SUMMARY OF THE INVENTION

It is therefore an object of the present invention to provide an optical disk recording method and device which can control the light beam power promptly with increased accuracy.

In order to accomplish the above-mentioned object, the present invention provides a method of irradiating a recording light beam onto an optical disk to form therein a series of pits having lengths ranging from 3Ts to 11Ts—where T represents a length of a basic or unit time period in a longitudinal direction of a pit track—which comprises the steps of: sampling and holding a level of a reflection signal, representative of a reflection of the recording light beam from the optical disk, for a predetermined time period between points of 1T and 3Ts after the start of a rising edge of the reflection signal; making a comparison between the level of the reflection signal sampled and held by the step of sampling and holding and a predetermined reference level; and controlling power of the recording light beam on the basis of a result of the comparison.

According to another feature of the present invention, there is provided an optical disk recording device which comprises: an optical pickup section that irradiates a recording light beam onto an optical disk to form therein pits having lengths ranging from 3Ts to 11Ts—where T represents a length of a basic or unit time period in a longitudinal direction of a pit track—and also receives a reflection of the recording light beam from the optical disk to thereby generate a reflection signal; a sample and hold section that samples and holds a level of the reflection signal, generated by the optical pickup section, for a predetermined time period between points of 1T and 3Ts after the start of a rising edge of the reflection signal; a comparator section that makes a comparison between the level of the reflection signal sampled and held by the sample and hold section and a predetermined reference level; and controlling power of the recording light beam on the basis of a result of the comparison by the comparator section.

When a light beam is irradiated onto a dye-layer-type optical disk, the reflection signal presents high levels at the beginning of the light beam irradiation because no pit has not yet been formed in the optical disk. Then, as formation of a pit progresses, the reflectivity of the optical disk gradually decreases, so that the reflection signal becomes correspondingly lower in level and then presents a stable level. Once disturbance occurs in the scattering or absorption of the light beam due to a fingerprint, dust or other foreign matter present on the recording surface of the optical disk, the level of the reflection signal would vary entirely. In order to promptly detect variations in the reflection signal level for efficient control of the irradiated light beam power, it is desirable to properly detect levels at and around the start of an initial rising phase of the reflection signal. However, at the start of the rising phase of the reflection signal, the occurrence of the disturbance would exert very little effect on the resultant reflection signal level; particularly, it is very difficult to identify the disturbance on the basis of detected levels at a right shoulder part of the signal's peak region. Further, since the reflection signal presents rapidly-varying levels at and around the peak region in the rising phase, a complicated circuit is required for sampling and holding the rapidly-varying signal levels, and besides it is sometimes impossible to acquire accurate signal levels due to the fact that the signal levels are saturated through amplification by an HF amplifier before being properly held by the sample and hold circuit. The high-level period of the reflection signal lasts until one unit time period (1T) elapses after the start of the rising phase.

Thus, according to a primary feature of the present invention, the reflection signal is sampled and held for a predetermined time period between points of 1T and 3Ts after the start of the rising edge of the reflection signal. With this feature, levels of the reflection signal can be sampled and held just after arrival of such a time point when detection of any disturbance can be made with ease. Further, with the sampling timing thus set to arrive between the points of 1T and 3Ts after the start of the rising edge of the reflection signal, it is possible to sample only stable levels of the reflection signal even when a shortest pit of a 3T length is to be formed, and thus accurate and prompt feedback control is always achieved with respect to a recording signal having pulse widths or lengths in the range of 3Ts to 11Ts.

An average of the sampled and held levels is used as the predetermined reference level for comparison with each sampled and held level of the reflection signal, and the light beam power is controlled on the basis of the comparison between the sampled and held level and the reference level. Thus, the reference level can be adjusted appropriately in accordance with a waveform of the reflection signal that would vary depending on the reflectivity of the optical disk and selected recording speed as well as the radial (inner or outer) position of the light beam spot on the optical disk. This arrangement allows the recording power to be controlled with even higher accuracy.

Further, the reflection signal may also vary in level depending on a selected recording speed, material, recording sensitivity of the optical disk. Thus, it is also desirable to change the generation timing (time position) and length of sampling pulses in accordance with the type of the optical disk. For this purpose, the optical disk recording device of the invention may further comprise: a storage section that stores therein information indicative of optimum sampling pulses corresponding to a plurality of types of optical disks; a disk identifying section that identifies a particular type of the optical disk; and a sampling pulse generator section that reads out, from the storage section, the information indicative of one of the optimum sampling pulses which corresponds to the type of the optical disk identified by the disk identifying section and generates a sampling pulse based on the read-out information.

BRIEF DESCRIPTION OF THE DRAWINGS

For better understanding of the above and other features of the present invention, preferred embodiments of the invention will hereinafter be described in greater detail with reference to the accompanying drawings, in which.

DETAILED DESCRIPTION OF THE PREFERRED EMBODIMENTS

Figure 1:
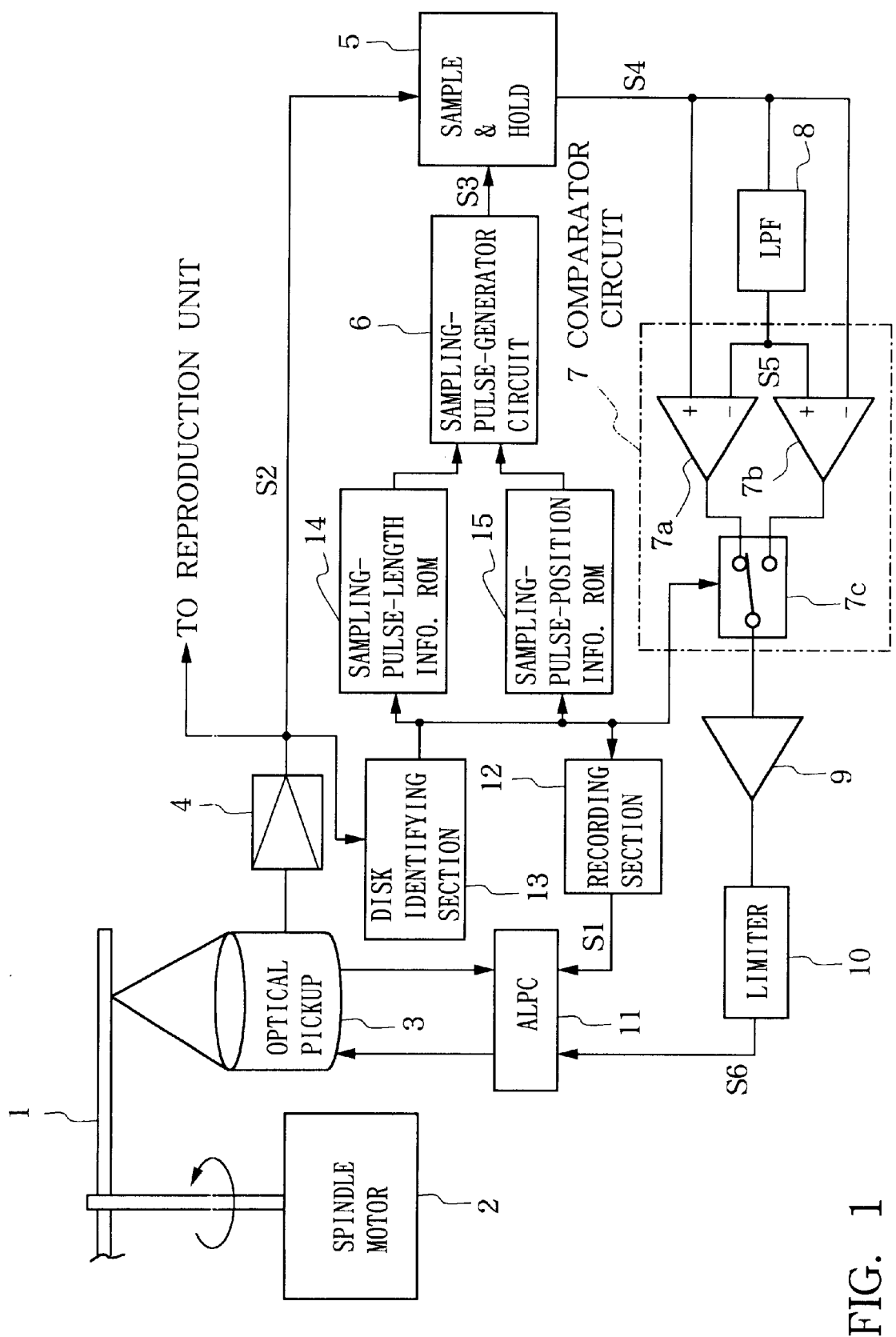
FIG. 1 is a block diagram showing an exemplary hardware organization of an optical disk recording device in accordance with an embodiment of the present invention.

FIG. 1 is a block diagram showing an exemplary hardware organization of an optical disk recording device in accordance with an embodiment of the present invention. Optical disk 1 is, for example, a CD-WO (Write-Once) optical disk which includes a transparent substrate of polycarbonate having lands and grooves formed therein at 16 $\mu$m intervals, and a layer of dye such as cyanine, phtalo or diazo dye. The optical disk 1 is driven by a spindle motor 2 to rotate, for example, at a constant linear velocity. Optical pickup 3 is disposed in opposed relation to the recording surface of the optical disk 1 and is controllably driven by a feed motor (not shown) to move along the radius of the optical disk 1.

The optical pickup 3 includes a built-in laser diode that irradiates a recording laser light beam onto the recording surface of the optical disk 1. Reflection of the recording laser light beam from the optical disk 1 is received by the optical pickup 3, which in turn outputs a reflection signal S2 representative of the reflection of the light beam. The reflection signal S2 is amplified via an HF amplifier 4 and then fed to a sample and hold circuit 5. The sample and hold circuit 5 samples and holds the reflection signal S2 from the optical pickup 3 in response to each sampling pulse output from a sampling pulse generator circuit 6. Each signal value or level S4 sampled and held by the sample and hold circuit 5 is passed to one input of a comparator circuit 7. Output S5 from a low-pass filter (LPF) 8, which functions to average the sampled and held signal values, is given to the other input of the comparator circuit as a reference level. Output from the comparator circuit 7 is supplied to an automatic laser power control (often abbreviated ALPC) circuit 11 by way of a gain control circuit 9 and a limiter 10 functioning to prevent a laser power decrease. On the basis of the output from the comparator circuit 7, the automatic laser power control (ALPC) circuit 11 controls the laser power for recording data in accordance with a recording signal S1 that is generated by a recording section 12.

In the illustrated example, generation timing (time position) and width (length) of each sampling pulse S3 are set to optimum values depending on the type or characteristics of the optical disk 1. For this purpose, a disk identifying section 13 determines various characteristics of the disk 1, such as a recording speed magnification and material of the disk 1, from ID information previously-recorded on the disk 1. On the basis of the thus-determined characteristics of the disk 1, the disk identifying section 13 reads out generation timing (time position) and length of the sampling pulse S3 from a sampling-pulse-position information ROM 15 and a sampling-pulse-length information ROM 14, and then sends the read-out information to the sampling pulse generator circuit 6. The two ROMs 14 and 15 contain tables of optimum positions and lengths of the sampling pulse which correspond to various possible types of optical disks and were determined in advance through experiments. This way, the sampling pulse generator circuit 6 is allowed to generate a sampling pulse S3 suitable for the particular type of the optical disk 1.

Figure 2:
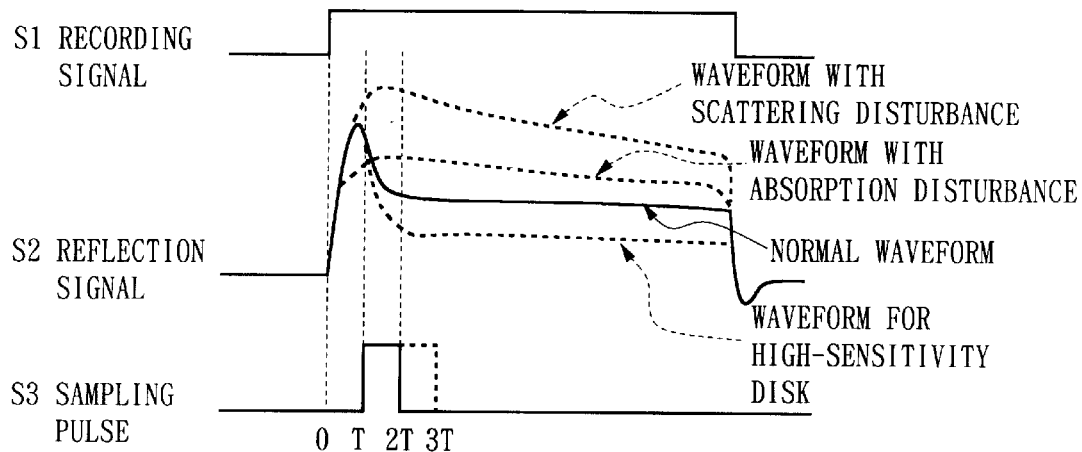
FIG. 2 is a waveform diagram showing exemplary relationship between a recording signal, a reflection signal and timing for sampling the reflection signal in the optical recording device of FIG. 1.
Figure 4:
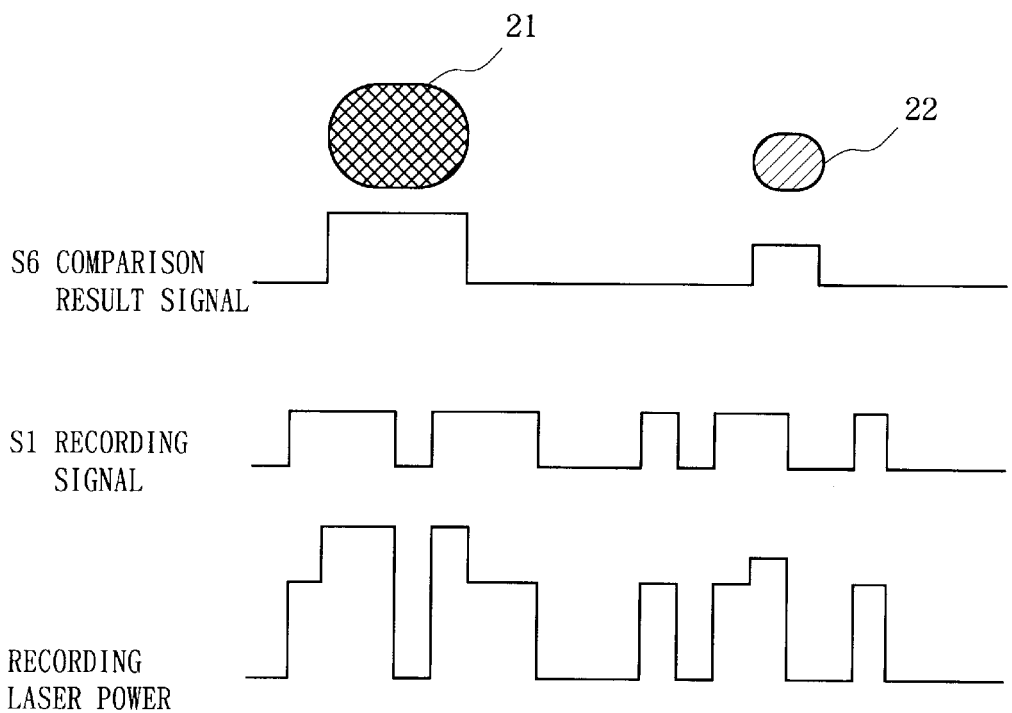
FIG. 4 is a waveform diagram showing exemplary relationship between a result of comparison between the sampled reflection signal level result signal and a predetermined reference level and recording laser power control in the optical disk recording device.

FIG. 2 is a waveform diagram showing exemplary relationship between the recording signal S1, reflection signal S2 and sampling pulse S3.

The recording signal S1 takes the form of successive pulses have lengths in the range of three times to eleven times of a unit time period T; that is, each of the pulses has any one of 3T to 11T lengths. The reflection signal S2 generated by the optical pickup 2 upon receipt of a reflection of the laser light beam, irradiated from the optical pickup 3 onto the optical disk 1 in accordance with the recording signal S1, first rises to a positive-side peak value in response to a rising edge of the recording signal S1 and then falls to a predetermined level, after which it gradually decreases in level till a point where it suddenly drops to a negative-side peak value in response to a falling edge of the recording signal S1. After reaching the negative-side peak value, the reflection signal S2 returns to an initial zero level. In the event that some disturbance occurs in the scattering or absorption of the laser light due to a fingerprint or dust adhering to the surface of the optical disk 1, the reflection signal S2 may present a stable level higher or lower than its normal-state stable level, as shown.

Because such a level variation can exert a significant influence on the recording stability, there arises a need to feed back the irradiated laser power on the basis of the detected level of the reflection signal S2. The level of the reflection signal S2 has to be detected promptly for efficient feedback control, but it is sometimes possible that no disturbance in the scattering or absorption of the laser light is detected in the rising phase of the signal.

Thus, according to the described embodiment, a time period between points of 1T and 3Ts after the start of the rising edge of the reflection signal S2 is set for sampling levels of the reflection signal S2. By setting such a sampling period, the levels of the reflection signal S2 can be detected as soon as the signal S2 completes its rising phase and reaches a next phase where presence of any disturbance can be easily detected, and also the signal level detection can be made accurately even for a shortest, i.e., 3T-length, pulse of the recording signal pulse S1. As further shown in FIG. 2, for a high-sensitivity optical disk requiring less laser power, the normal waveform of the reflection signal S2 presents a lower overall level than that obtained for the ordinary optical disk, and accordingly the optimum sampling position and pulse length do differ from those for the ordinary optical disk. Further, as the recording speed is changed, the absolute length of the unit time period T varies, so that the time length of the rising phase of the reflection signal would also vary relative to the total recording time; for instance, as the recording speed is increased, the time length of the rising phase of the reflection signal would increase relative to the total recording time.

In the light of these, the optical disk recording device of FIG. 1 is designed to generate optimum sampling pulses corresponding to the particular type of the optical disk used. Namely, according to the described embodiment, the sampling of the reflection signal S2 responsive to the sampling pulse is carried out at a time point when the reflection signal S2 has just completed or is on the verge of completing its rising phase, so as to be appropriately adaptable to high-speed recording. In such a case, it is preferred that the length of the sampling pulse be as small as possible, say 0.5 T, because the minimized sampling pulse length can lead to an enhanced detection accuracy and processing speed. For the same reasons, it is preferred that each sampling timing be set to an optimum value with an accuracy of a few nanoseconds.

With the state of the art today, a small fingerprint, scratch or the like present on a CD-WO recording medium tends to cause disturbance in the reflection of the irradiated light beam, and dust or large scratch on a CD-WO optical recording medium or a fingerprint, dust scratch present on a CD-RW (Rewritable) recording medium tends to cause disturbance in the absorption of the irradiated laser light beam. When levels of the reflected signal at a right shoulder part of its peak region are to be sampled, there would arise the following tendencies:

CD-WO: S4<S4'     (1)

CD-RW: S4>S4'     (2)

where S4 represents a sampled/held signal level in a normal state and S4' represents a sampled/held signal level in a disturbed state.

Thus, the comparator circuit 7 in the optical disk recording device of FIG. 1 comprises two differential amplifies 7a and 7b which compare the sampled/held signal level with the reference level given from the low-pass filter 8 in different polarities. Thus, when the disk identifying section 13 identifies the optical disk 1 as the CD-WO type, the comparator circuit 7 selects the output from one of the differential amplifiers 7a, but when the disk identifying section 13 identifies the optical disk 1 as the CD-RW type, the comparator circuit 7 selects the output from the other differential amplifier 7b.

Figure 3:
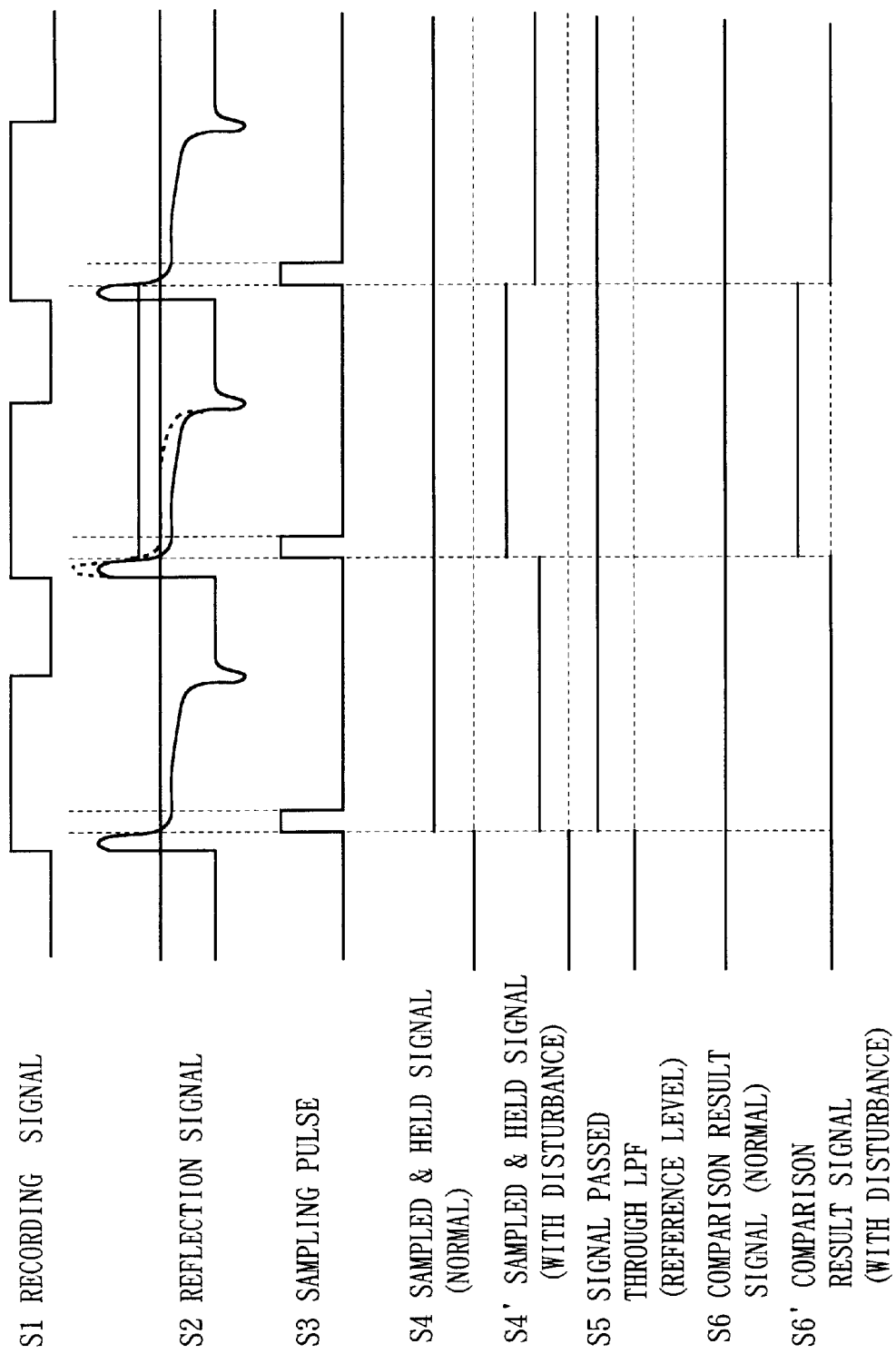
FIG. 3 is a waveform diagram explanatory of behavior of the optical disk recording device.

FIG. 3 is a waveform diagram explanatory of behavior of the optical disk recording device in accordance with the embodiment of the present invention.

When there is no disturbance in the scattering and absorption of the laser light beam irradiated onto the optical disk 1, the level of the reflection signal S2 corresponding to the recording signal S1 remains stable as denoted in solid line, so that the value S4 sampled and held by the sample and hold circuit 5 within sampling time period between points of 1T and 3Ts also remains substantially constant. Because of this, the comparison result signal output from the comparator circuit 7 keeps a near-zero level indicating that the recording surface of the optical disk 1 is in a normal or disturbance-free state.

If there is any disturbance in the scattering of the laser light beam due to, for example, a fingerprint on the optical disk 1, then the sampled/held value greatly varies as denoted at S4' in FIG. 3. Because the reference level S5, obtained by averaging the sampled/held values through the low-pass filter 8, maintains substantially the same level as when there is no disturbance, the level of the comparison result signal S6' increases in response to the disturbed scattering of the laser light beam, which is then feed back to the automatic laser power control (ALPC) circuit 11 to be controlled thereby in such a way that the optical pickup 3 increases its output laser power.

The output level of the comparator circuit 7 varies depending on the degree of the disturbance. For instance, the comparator circuit 7 outputs a greater level when a relatively heavy fingerprint 21 is present on the optical disk 1 than when a lighter fingerprint 22 is present on the optical disk 1. Accordingly, the level of the recording laser power becomes greater in the former case than in the latter case.

In summary, the present invention is characterized in that the reflection signal is sampled and held for a predetermined time period between points of 1T and 3Ts after the start of the rising edge of the reflection signal. With this feature, levels of the reflection signal can be sampled and held just after arrival of a specific time point when detection of any disturbance can be made easily. In addition, it is possible to sample only stable levels of the reflection signal even when a shortest pit of a 3T length is to be formed, and thus accurate and prompt feedback control is always achieved with respect to a recording signal having pulse widths or lengths in the range of 3Ts to 11Ts.

What is claimed is:

1. A method of irradiating a recording light beam onto an optical disk to form therein pits having lengths ranging from 3Ts to 11Ts (where T represents a length of a unit time period in a longitudinal direction of a pit track), said method comprising the steps of:

sampling and holding a level of a reflection signal, representative of a reflection of the recording light beam from the optical disk, for a predetermined time period between points of 1T and 3Ts after a start of a rising edge of the reflection signal;

making a comparison between the level of the reflection signal sampled and held by the step of sampling and holding and a predetermined reference level; and controlling power of the recording light beam on the basis of a result of the comparison.

2. A method as recited in claim 1 wherein said predetermined reference level is given by averaging the sampled and held level of the reflection signal in a longer cycle than a cycle in which the reflection signal is sampled and held.

3. An optical disk recording device comprising:

an optical pickup section that irradiates a recording light beam onto an optical disk to form therein pits having lengths ranging from 3Ts to 11Ts (where T represents a length of a unit time period in a longitudinal direction of a pit track) and also receives a reflection of the recording light beam from the optical disk to thereby generate a reflection signal;

a sample and hold section that samples and holds a level of the reflection signal, generated by said optical pickup section, for a predetermined time period between points of 1T and 3Ts after a start of a rising edge of the reflection signal;

a comparator section that makes a comparison between the level of the reflection signal sampled and held by said sample and hold section and a predetermined reference level; and controlling power of the recording light beam on the basis of a result of the comparison by said comparator section.

4. An optical disk recording device as recited in claim 3 which further comprises a filter section that generates an average of the sampled and held level of the reflection signal and outputs the average as said predetermined reference level.

5. An optical disk recording device as recited in claim 4 which further comprises:

a storage section that stores therein information indicative of optimum sampling pulses corresponding to a plurality of types of optical disks;

a disk identifying section that identifies a particular type of said optical disk; and a sampling pulse generator section that reads out, from said storage section, the information indicative of one of the optimum sampling pulses which corresponds to the type of the optical disk identified by said disk identifying section and generates a sampling pulse based on the read-out information.

6. An optical disk recording device as recited in claim 3 which further comprises:

a storage section that stores therein information indicative of optimum sampling pulses corresponding to a plurality of types of optical disks;

a disk identifying section that identifies a particular type of said optical disk; and a sampling pulse generator section that reads out, from said storage section, the information indicative of one of the optimum sampling pulses which corresponds to the type of the optical disk identified by said disk identifying section and generates a sampling pulse based on the read-out information.

* * * * *